United States Patent [19]
Faulkner et al.

[11] Patent Number: 4,815,803
[45] Date of Patent: Mar. 28, 1989

[54] OPTICAL SIGNAL NETWORK WITH NODE BY-PASS SWITCHING CAPABILITY

[75] Inventors: David W. Faulkner; Peter Healey, both of Ipswich, England

[73] Assignee: British Telecommunication, plc, London, England

[21] Appl. No.: 870,765

[22] Filed: Jun. 26, 1986

[30] Foreign Application Priority Data

Sep. 17, 1984 [GB] United Kingdom ............... 8423430

[51] Int. Cl.$^4$ ............................................. G02B 6/28
[52] U.S. Cl. ........................... 350/96.14; 350/96.13; 350/96.16
[58] Field of Search ............... 350/96.11, 96.12, 96.13, 350/96.14, 96.16, 96.19, 96.20

[56] References Cited

U.S. PATENT DOCUMENTS

| | | | |
|---|---|---|---|
| 4,252,402 | 2/1981 | Puech et al. | 350/96.16 X |
| 4,452,507 | 6/1984 | Winzer | 350/96.20 |
| 4,461,543 | 7/1984 | McMahon | 350/383 |
| 4,573,215 | 2/1986 | Oates et al. | 350/96.16 X |

FOREIGN PATENT DOCUMENTS

| | | |
|---|---|---|
| 0080343 | 1/1983 | European Pat. Off. |
| 0094866 | 11/1983 | European Pat. Off. |
| 0147195 | 7/1985 | European Pat. Off. |
| 57-86817 | 5/1982 | Japan ............................ 602 F/1103 |

OTHER PUBLICATIONS

Soref et al., "Multimode 2 X 2 Optical Crossbar Switch", Electronics Letters, vol. 14, No. 9, Apr. 1978, pp. 283–284, (350/96.13).
Becker et al., "Eletrooptical Switching In Thin Film Waveguides For A Computer Communication Bus", Applied Optics, vol. 18, No. 19, Oct. 1979, pp. 3296-3300.
"Fiber Optics Offers Promise in Data–Network Design", Mirtich, pp. 93–100, EDN Mar. 4, 1981.
"Optical Channel Waveguide Switch and Coupler Using Total Internal Reflection", pp. 513–517, Tsai et al., IEEE Journal of Quantum Electronics, vol. QE-14, No. 7, Jul. 1978.
"A Fiberoptic Local–Area-Network Solution For Tactical Command and Control Systems", Proc. SPIE-vol. 434, Aug. 25, 1983, San Diego, Vlasak et al.
"Calcite 2 X 2 Optical Bypass Switch Controlled By Liquid-Crystal Cells", Optics Letters, vol. 7, No. 4, Apr. 1982, Soref et al.
Applied Optics, vol. 18, No. 19, Oct. 1, 1979, R. A. Becker et al.: "Electrooptical Switching In Thin-Film Waveguides For A Computer Communication Bus", pp. 3296–3300.
Patents Abstracts of Japan, vol. 6, No. 168, Sep. 2, 1982, p. 139 & JP, A, 57-86817, (Nippon Denki K. K.), May 31, 1982, see the whole document.
Patents Abstracts of Japan, vol. 7, No. 18, Jan. 25, 1983, p. 170 & JP, A, 57-73803 (Fujitsu K. K.), Oct. 26, 1982.
Proceedings of National Electronics Conference, vol. 33, 29–31, Oct. 1979, R. A. Soref et al.: "Fiber-optic Switching Techniques", pp. 188–193.
Integrated Optics, Salt Lake City, Utah, (US), Jan. 12–14, 1976, published in 1976, Washington, (US), pp. MA4-1-MA4-3.

Primary Examiner—John D. Lee
Attorney, Agent, or Firm—Nixon & Vanderhye

[57] ABSTRACT

A node of an optical transmission network, for example a local area network, has a combined by-pass switch and optical modulator. The by-pass switch and modulator (45) comprises an optical switching matrix with two non-intersecting waveguides (W1, W2) connected by a further waveguide (W3). The junctions between the non-intersecting waveguides and the further waveguide perform both modulation of an optical carrier signal and re-routing of the transmission path along the network.

14 Claims, 4 Drawing Sheets

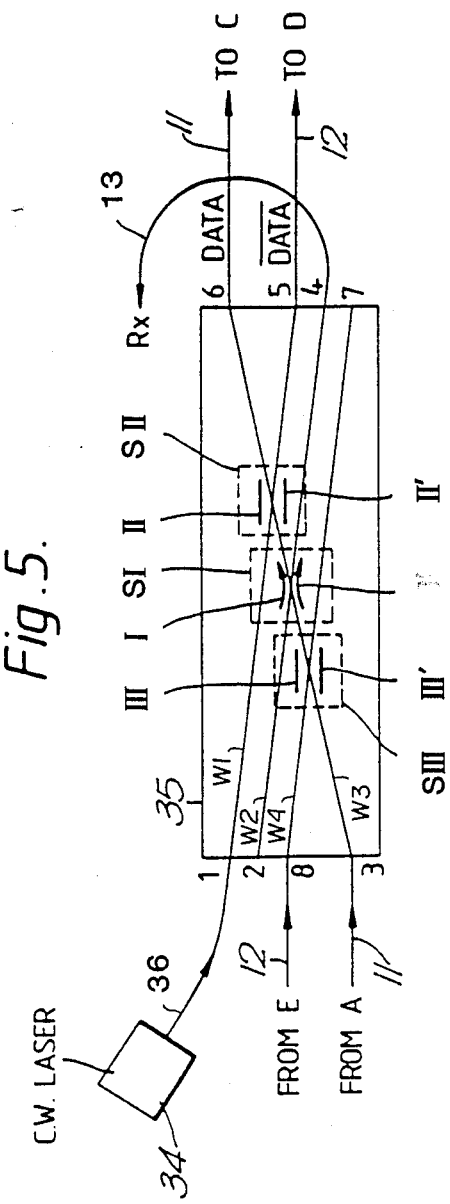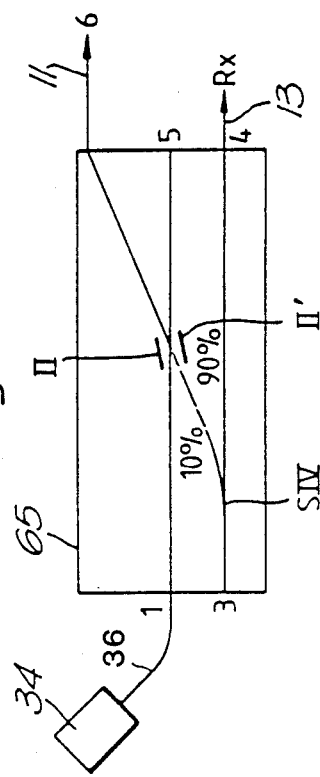

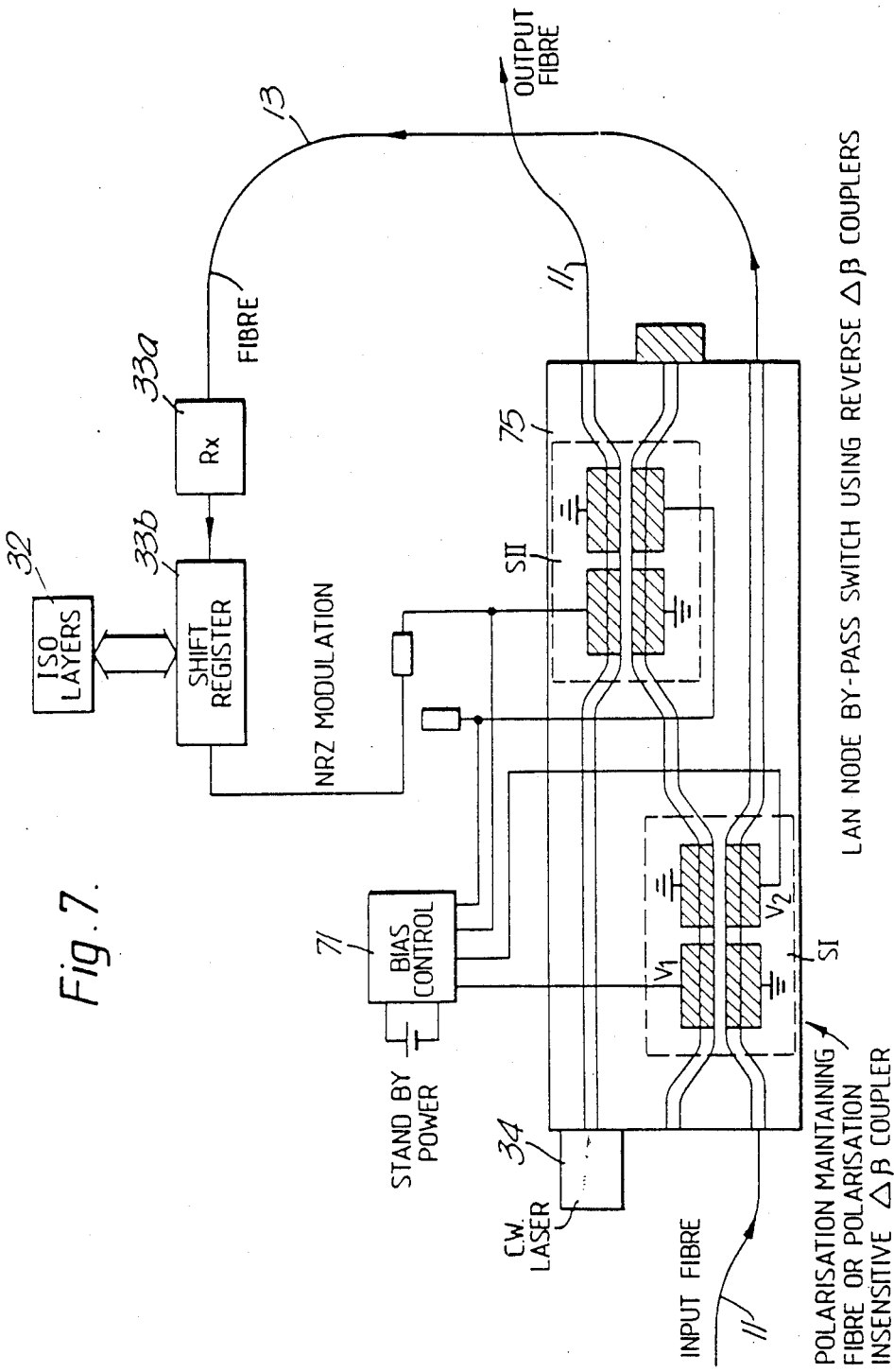

OPTICAL SIGNAL NETWORK WITH NODE BY-PASS SWITCHING CAPABILITY

This invention relates to optical switching means, and in particular to means for switching and/or modulating optical signals.

While the low transmission losses achievable with optical fibre transmission systems are one of the primary reasons for the adoption of such systems for long distance communications, e.g. in the telephone trunk network, the potentially very high transmission bandwidth capability of optical fibre transmission systems, and especially of single mode optical fibre transmission systems, makes such systems equally attractive for applications in short distance and local communication networks, such as, for example, local area networks. Thus, it is for example envisaged that single mode optical fibre local area networks (LANs) will offer a range of services including video transmission, high speed file transfer, high definition graphics and telephony, as well as a range of computer networking facilities.

Optical fibre networks having a single transmission path connecting all its nodes are, just like conventional metal-wire systems, vulnerable to disruption of communications around the network in the event of a single break in the transmission path.

It has therefore been proposed to provide, in a manner akin to conventional networks, re-routing facilities for the transmission path, and in particular to provide by-pass facilities for the nodes. These known by-pass facilities comprise passive optical couplers at each side of a node which divert a fraction, usually about 10%, of the optical signal power incident on a node directly to the next following section of the transmission line. Disadvantages associated with this known technique are, for example, not only that there is at all times a power loss at each by-pass, but also that in the event of a failure of a node a very much lower incident signal than normal is received at the next following node.

The present invention has as one of its objects to provide improved means for re-routing optical signals.

Another object of the invention is to provide combined optical path switching and optical signal modulating means.

According to one aspect of the present invention, an optical network connection comprises an optical waveguide structure with at least two non-intersecting waveguides and a further waveguide forming waveguide junctions with said waveguides, wherein at least one of said junctions comprises an optical switch.

According to another aspect of the present invention a node of an opitcal transmission network comprises an optical switching matrix having at least two non-intersecting waveguides, a further waveguide forming junctions with said non-intersecting waveguides, and means to switch optical signals between the non-intersecting waveguides and the further waveguides, wherein modulation of an optical signal is provided by switching optical signals between one and the other of the outputs of at least one of said junctions. The junctions may, for example, be optical crosspoint switches comprising obliquely intersecting waveguides and switching electrodes, or may be electro-optic directional couplers.

The optical waveguides are conveniently formed as embedded waveguides in a substrate such as, for example, lithium niobate.

The present invention will now be described further by way of example and with reference to the accompanying drawings of which:

FIG. 5 illustrates schematically a suitable waveguide structure for the switch of the node of FIG. 3;

FIG. 6 illustrates an alternative form of a modulator and by-pass switch; and

FIG. 7 is a schematic diagram of an alternative waveguide structure for the node switch of FIG. 3.

Figure 1:
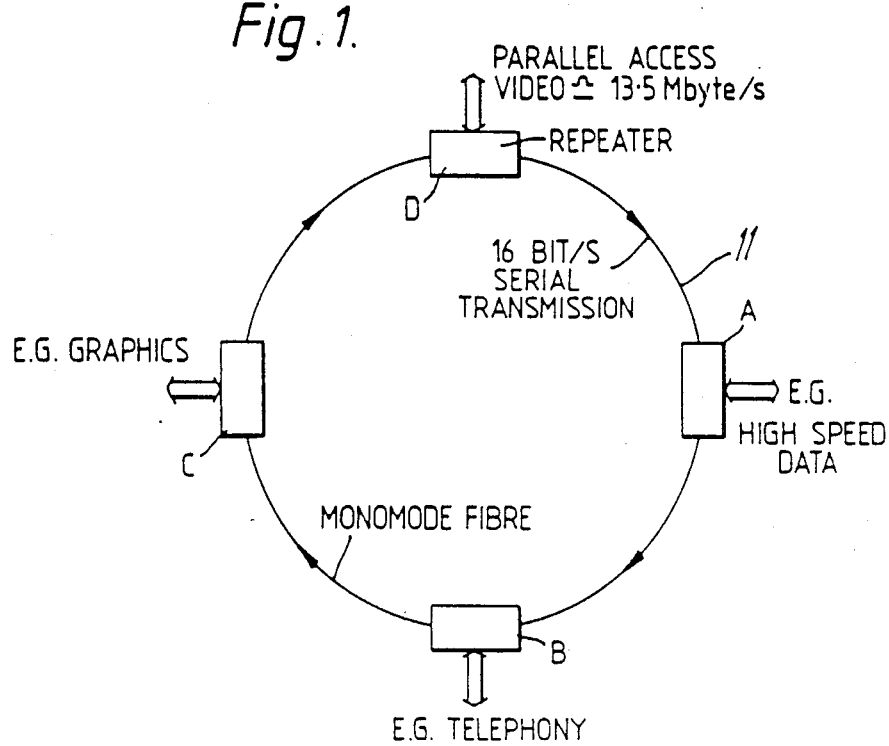
FIG. 1 is a schematic diagram of a ring-like communications network between several nodes.

Referring first to FIG. 1, a ring-like local area network comprises four nodes A, B, C and D, each connected to its respective preceding and following nearest nodes by a single mode fibre 11. Such networks, operating at, nominally, 1.3 $\mu$m or 1.5 $\mu$m wavelength, will be capable of providing transmission bandwidths in excess of 1 Gbit/s, thus enabling the connected users to have access to a range of services, including high bandwidth services such as video transmission. It should be noted that each of the users at A, B, C, D will usually have access to several of the services indicated in FIG. 1.

Figure 2:
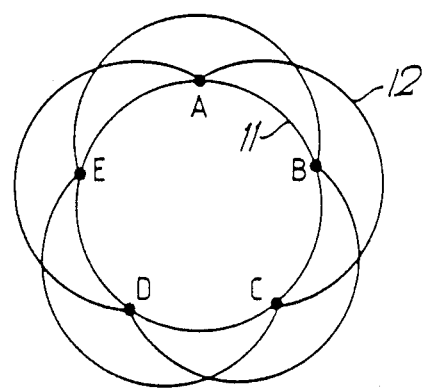
FIG. 2 is a schematic diagram of a braided ring communications network.

FIG. 2 is a schematic diagram of a network, also called a braided network, in which alternative transmission paths are provided between the nodes of the network. The network illustrated has five nodes, A to E, and each is connected directly by a single-mode optical fibre 11 to its nearest neighboring nodes as well as, via a different optical fibre 12, to its next nearest nodes. Thus, for example, node B is connected to its nearest neighboring nodes A and C via fibre 11, as well as to the next nearest nodes E and D via fibre 12.

Figure 3:
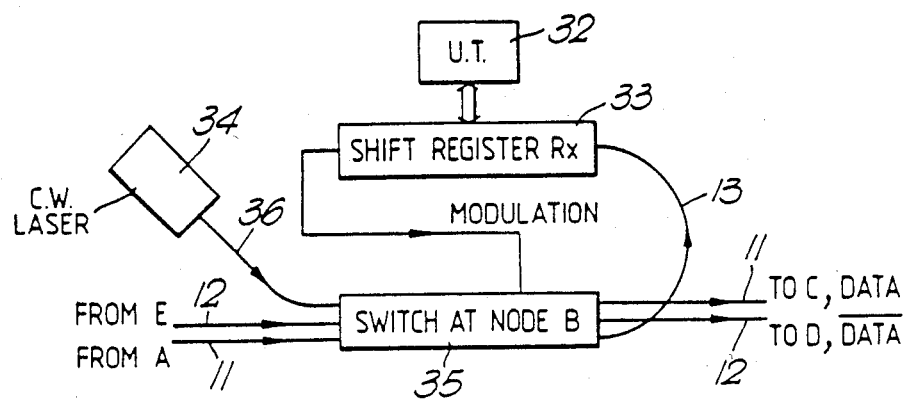
FIG. 3 is a schematic diagram of a node of the network of FIG. 2.

Referring now also to FIG. 3, under normal operating conditions each node A to E receives optical signals, which may, for example, convey information in digital form as discrete packets, from its immediately preceding node. In the case discussed here, node B receives the signals from node A. The signals from node A are switched via switch 35 and fibre 13 to be converted in a receiver portion of transceiver 33 at B from optical to electrical form in a known manner and supplied to a buffer shift register. Information destined for node B, or an associated user terminal 32, is extracted and, in accordance with appropriate protocols, new information from the user terminal 32 can, as necessary, be added at node B.

The shift register output is an electrical signal which serves to modulate light from a laser light source 34 supplied via fibre 36 as described below, thereby converting the electrical signal into an optical signal for onward transmission to the next node, node C in this case.

The same procedure is repeated at each of the nodes A to E, thus completing information transmission around the ring.

In the event, however, that one of the nodes A to E, or the transmission lines 11 to the nearest nodes develops a fault condition, the further transmission lines 12 between next nearest nodes can be used to by-pass the faulty section of the network.

Figure 4:
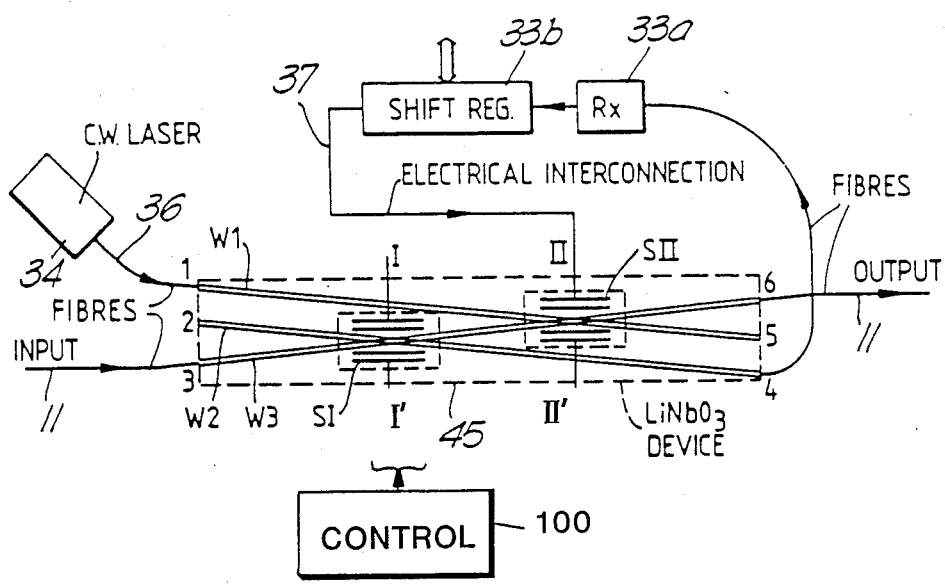
FIG. 4 illustrates schematically a node switch for the network of FIG. 1.

FIG. 4 illustrates in schematic form a lithium niobate waveguide device 45 capable of performing both bypass switching and modulation of the outgoing and onward transmitted information from a node which is, for the purpose of the present illustration, again assumed to be node B.

The device consists of two parallel waveguides W1 and W2 and one further waveguide W3 which intersects the waveguides W1 and W2. Both intersections are provided with control electrodes I, I' and II, II', and form optical path switches SI, SII such as described in Electronics Letters, Chang C L and Tshi C S, 1980 'Electro-optical channel waveguide matrix using total internal reflection', Topical Meeting on Integrated and Guided Wave Optics, Incline Village, Nev., USA, paper TuE4.

Such switches allow optical signals to be switched by a voltage applied to electrode pairs such as I, I' or II, II' from one waveguide input to one or the other of the waveguide outputs. Thus, for example, laser light from the CW laser source 34 applied to terminal 1 can be switched between output terminals 5 and 6 of the device via electrical signals from line 37 output from transmit shift register 33b.

If the output to the next node c is coupled to terminal 6 as shown, then actuating the switch SII by the electrical output signal from the shift register 33b performs intensity modulation in respect to that output by switching optical power into and away from output terminal 6 (output:data), an inverted replica (data) of the modulated signal appearing at output terminal 5 of the device.

Similarly, light from a preceding mode arriving at terminal 3 can be switched by means of switch SI between output 4 and switch SII.

A d.c. voltage from control 100 applied to switch the electrodes I, I', of switch SI ensures under normal operating conditions that incoming optical signals at terminal 3 are directed to terminal 4 and hence the photodetector 33a of the transceiver 33 at node B. In the event of a power failure, or if the bias voltage at switch SI is removed in response to a fault condition in the node B, incoming optical signals are passed straight through switches SI and SII, and are passed on via terminal 6 to the next node. It will be readily appreciated that the switch matrix 45 thus performs the function of both a by-pass switch as well as a modulator of the laser output for onward transmission of optical signals to the next network mode. The modulator and by-pass switch 45 as shown in FIG. 4 is suitable for use with, for example, the single ring network of FIG. 1.

As previously mentioned, single path networks such as that shown in FIG. 1 are susceptible not only to terminal failure but also to disruption by a break in the transmission line. By coupling input terminal 2 of the device to the nearest but one previous node, and output 5 of the device to the nearest but one following node of the network via fibre 12 it becomes possible also to by-pass faulty section of inter-nodal transmission line 11 in the manner discussed in relation to FIG. 2 above.

FIG. 5 is a schematic diagram of the by-pass switch and modulator 35 of FIG. 3 employed in the arrangement of FIG. 2. The switch and modulator 35 is a modified form of the switch and modulator 45 of FIG. 4, the main modification being the addition of a fourth waveguide W4 (extending between ports 8 and 7 of device 35) and crosspoint switch SIII having control electrodes III, III'. The purpose of the additional crosspoint switch SIII is to reduce crosstalk when the modulator and by-pass switch 35 is used with the braided network such as that of FIG. 2.

FIG. 6 shows a further modified form of a combined modulator and by-pass switch 65 according to the present invention. In the device 65 of FIG. 6, one of the crosspoint switches (SI) have been replaced by a passive beam splitting device SIV. It should be noted that this arrangement incurs greater transmission losses than the modulator and by-pass switch arrangement of FIGS. 3 to 5.

FIG. 7 illutrates in schematic form an implementation 75 of the modultor and by-pass switch of FIG. 4 using electro-optic directional couplers such as described, for example, by Schmidt R V, and Alferness R C, 1970, "Directional coupler switches modulators and filters using alternating $\Delta\beta$ techniques", IEEE Trans. Circuits and Systems CAS 1009-1108. The directional coupler switches may be of the type employing stepped $\Delta\beta$ reversal, in which case a standby power supply is required for the bias control 71, or of the type which provides coupling of optical signals between the waveguides even in the absence of a bias voltage and hence does not require standby power. In other respects the arrangement of FIG. 7 is identical to that of FIG. 4.

We claim:

1. An optical signal network having plural optical signal input/output nodes interconnected by optical fibres and having at least one such node which includes:
   a signal transceiver; and
   optical switch means capable of selectively (a) connecting said signal transceiver serially into said network between an incoming optical fibre and an outgoing optical fibre and (b) bypassing said transceiver by effecting an alternate optical connection between an incoming optical fibre and an outgoing optical fibre, wherein said switch means includes: means for making said alternate connection from an incoming optical fibre which is connected to a different node than the incoming fibre used for effecting a connection to said transceiver, and means for making said connection from the transceiver to at least two different outgoing optical fibres each connected to a different node.

2. An optical signal network having plural optical signal input/output nodes interconnected by optical fibres and having at least one such node which includes:
   a signal transceiver; and
   optical switch means capable of selectively (a) connecting said signal transceiver serially into said network between an incoming optical fibre and an outgoing optical fibre and (b) bypassing said transceiver by effecting an alternate optical connection between an incoming optical fibre and an outgoing optical fibre, wherein said switch means includes: means for making said alternate connection from an incoming optical fibre which is different from the incoming fibre used for effecting a connection to said transceiver and a four-port, electrically controlled, first optical junction means (SII) having one input port connected in cascade with an output port of a four-port, electrically controlled, second optical junction means (SI or SI and SIII), said transceiver being connected between an output port of said second optical junction means and electrical control electrodes of said first optical junction means.

3. An optical signal network as in claim 2 wherein said second optical junction means comprises a pair of cascade-connected, electrically controlled optical junction means (SI and SIII).

4. A node apparatus for an optical communications network having at least three nodes, which node apparatus comprises:
- an optical receiver;
- a transmitting means for providing electrical information signals representative of information to be transmitted from the node;
- a control means for providing control signals;
- a source of an optical carrier signal;
- a first optical junction means having a first and a second input and a first and a second output which is responsive to said signals from the transmitting means to switch an optical signal received at a selected first or second input to a selected first or second output;
- a second optical junction means having a third input and a third and fourth output which is responsive to said control signal to switch an optical signal received at said third input to a selected third or fourth output;
- said first input being optically coupled to said fourth output,
- said second input being optically coupled to said source of an optical carrier signal,
- said first output being connected to a first other node;
- said third input being optically coupled to a second other node; and
- said third output being optically coupled to said receiver.

5. A node apparatus as in claim 4 in which:
- said second output is optically coupled to a node other than said first other node;
- said second optical junction means has a fourth input coupled to a node other than the second other node and is responsive to said control signal to switch an optical signal received at either of said third and fourth inputs to a selected one of said third and fourth outputs with substantially no optical signal being switched to the non-selected output.

6. A node apparatus as in claim 4 or 5 in which the transmitting means includes a buffer shift register arranged to provide said electrical information signals, said receiver including an optical detector for converting received optical signals to corresponding electrical signals which are supplied to said buffer shift register, and means for altering the contents of said buffer shift register whereby information originating at the node can be added to said buffer shift register.

7. A node apparatus as in claim 4 or 5 in which the first and second optical junction means are formed by optical crosspoint switches.

8. A node apparatus as in claim 4 or 5 in which the optical junction means are formed from electro-optic directional couplers.

9. A node apparatus as in claim 7 in which the optical crosspoint switches comprise obliquely intersecting optical waveguides embedded in a lithium niobate substrate.

10. A node apparatus as in claim 8 in which the electro-optic directional couplers comprise optical waveguides embedded in a lithium niobate substrate.

11. A node apparatus as in claim 6 in which the first and second optical junction means are formed by optical crosspoint switches.

12. A node apparatus as in claim 6 in which the optical junction means are formed from electro-optic directional couplers.

13. A node apparatus as in claim 11 in which the optical crosspoint switches comprise obliquely intersecting optical waveguides embedded in a lithium niobate substrate.

14. A node apparatus as in claim 12 in which the electro-optic directional couplers comprise optical waveguides embedded in a lithium niobate substrate.

* * * * *